Oct. 17, 1944.        C. C. JACKSON        2,360,499
MOTOR VEHICLE LIGHTING
Filed Oct. 10, 1941        2 Sheets-Sheet 2
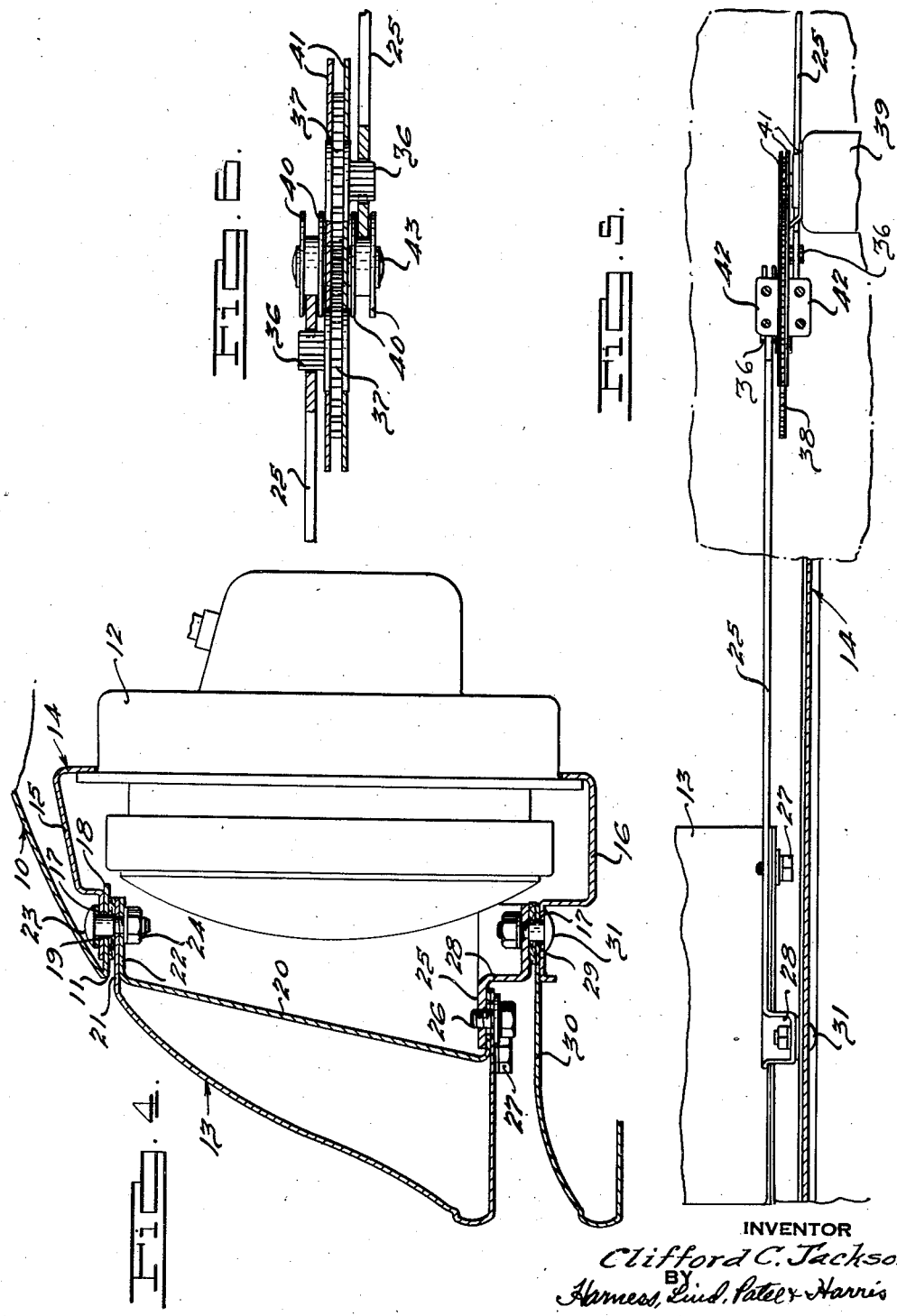
INVENTOR
Clifford C. Jackson.
BY
Harness, Dicky, Pitts & Harris
ATTORNEYS.

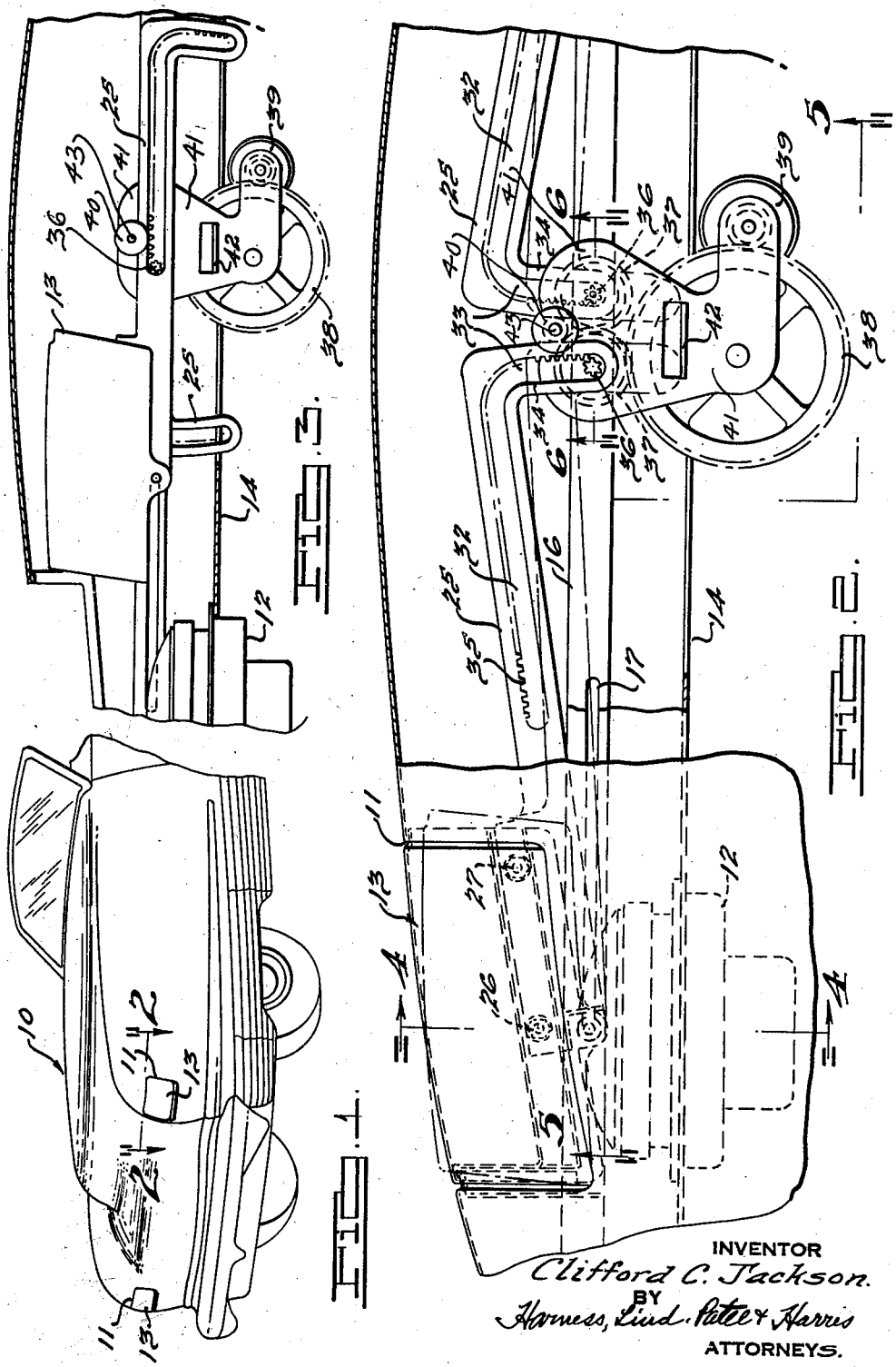

Patented Oct. 17, 1944

2,360,499

UNITED STATES PATENT OFFICE 2,360,499

MOTOR VEHICLE LIGHTING

Clifford C. Jackson, Highland Park, Mich., assignor to Chrysler Corporation, Highland Park, Mich., a corporation of Delaware Application October 10, 1941, Serial No. 414,419

10 Claims. (Cl. 240—7.1)

This invention relates to motor vehicle and more particularly to headlamp structures therefor.

An object of the invention is to provide a motor vehicle having a surface provided with laterally spaced openings behind each of which is disposed a headlamp together with a closure for each of the openings movable to mask and unmask the associated lamp, the closures completing the surface continuity of that portion of the vehicle having the openings.

Another object of the invention is to provide closures of the foregoing type which are movable in a path laterally of the vehicle to mask and unmask the lamp, at least a portion of each closure being movable generally transversely of this path as an incident to movement between masking and unmasking positions.

Another object of the invention is the provision of improved means for supporting the closures for movement as aforesaid and guiding such movement in a fixed path.

A still further object of the invention is to provide a rack and pinion arrangement for effecting movement of the closures as aforesaid, and to effect simultaneous movement of the closures.

Other objects and advantages of the invention will be more apparent from the following description taken in connection with the accompanying drawings, in which:

Fig. 1 is a fragmentary elevational view of a motor vehicle embodying the invention.

Fig. 2 is an enlarged fragmentary top plan view, parts being broken away in section, taken as indicated by the line 2—2 of Fig. 1.

Fig. 3 is a view similar to Fig. 2, but illustrating the movable parts in another position.

Fig. 4 is a view mainly in section taken as indicated by the line 4—4 of Fig. 2.

Fig. 5 is a view partly in section taken as indicated by the line 5—5 of Fig. 2.

Fig. 6 is a side elevational view taken on line 6—6 of Fig. 2.

The vehicle 10 has laterally spaced frontal surface portions each having an opening 11 behind which is disposed a headlamp 12. Each opening 11 is provided with a closure 13 adapted to be positioned to mask the lamp as illustrated in Fig. 2 and arranged for movement laterally of the vehicle to unmask the lamp, as illustrated in Fig. 3. Fig. 2 is typical of the closure mounting and the operating means therefor.

Extending transversely of the vehicle is a support 14, channel-shaped in cross section as shown more particularly in Fig. 4, to which the lamps 12 are fixedly secured. The upper and lower flanges 15 and 16, respectively, of the support are provided with longitudinally extending slots as indicated at 17 registering vertically. The frontal surface of the body 10 is provided with a flange 18, at the opening 11 which abuts the support flange 15 and is provided with a slot 19 registering with the slot 17.

The closure 13 and the reinforcing member 20 therefore are provided at the upper part thereof with rearwardly extending flanges 21 and 22 respectively having openings therein which register with the slots 17 and 19, all as shown in Fig. 4. A bolt 23 extending through the registering slots and opening as aforesaid secures the closure to the support flange 15 and body surface 10, the bolt having a reduced portion extending through the openings in the flanges 21 and 22 and a shoulder resting upon the top surface of the flange 21 and is drawn thereagainst by the nut 24. In this manner the closure is secured to the body surface 10 and support 14 for movement laterally of the body and for pivotal movement about an axis provided by the bolt 23, as will hereinafter appear.

Each closure 13 is moved as aforesaid by an arm 25 relatively rigidly secured to the closure and its reinforcement at spaced locations by bolts 26 and 27. Each arm 25 is provided with a depressed portion 28 having an opening therein registering with the slot 17 in the support flange 16 and a corresponding slot 29 in the flange 30 of the body 10. A bolt 31 is arranged with respect to the registering opening and slots similarly to the arrangement of the bolt 23 as set forth above and cooperates with the latter to accommodate the lateral and pivotal movement of the closure. It will be apparent that each arm 25 is supported for lateral movement with respect to the vehicle as well as pivotal movement.

Each arm 25 is provided with a slot 32 extending longitudinally thereof and an intersecting slot 33 in the angularly disposed end portion 34 thereof, one continuous wall of these slotted portions being provided with teeth 35 with which mesh an operating pinion 36. As illustrated more particularly in Fig. 6, the arms 25 are disposed at different levels in order to accommodate movement thereof by the pinions 36 acting on the teeth 35. Each pinion 36 has formed integral therewith a gear 37, which gears are in constant mesh, one of the gears 37 being in mesh with an idler gear 38 operatively connected with a prime mover such, for example, as an electrically operated motor 39.

The inner end portion of each arm 25 is disposed between a pair of spaced discs 40, and for this purpose the pairs of discs are vertically spaced. The gears 37, together with their pinions 36, are supported by a pair of spaced plates 41 having tabs 42 attached to the support member 14, one of the plates 41 carrying the prime mover 39. The discs 40 are secured to the plates 41 by a bolt 43.

In operation, with the closures in masking position with respect to the lamps as illustrated in Fig. 2, the pinions 36 initially operate on the teeth 35 of the relatively short slots 33 to simultaneously swing the arms 25 and closures 13 about an axis established by the bolts 23 and 31, thus breaking any seal which may have been formed by ice between the closure and body surface, the initial seal breaking movement being shown in dash lines of Fig. 2. Upon engagement of the pinions 36 with the teeth 35 of the relatively long slots 32 the arms 25 and closures are moved one toward the other, laterally with respect to the vehicle and the closures are disposed in unmasking position, as typified by the Fig. 3 showing, it being understood that the bolts 23 and 31 move in their respective slots 17. The foregoing initial movement of the closures also serves to retract at least a portion of the closure with respect to the associated opening in order to provide clearance sufficient to accommodate unmasking movement. It will be understood, of course, that the final increment of movement of the closure from unmasking to masking position is about its pivotal axis to a contour completing position as shown in the main views.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a motor vehicle having a frontal surface provided with an opening, a lamp disposed rearwardly of the opening, a closure movable between the lamp and opening to mask and unmask the lamp with respect to the opening, an operating member secured to said closure and movable in the direction of its longitudinal axis and swingable about an axis in a path generally transverse to the first axis to effect movement of the closure as aforesaid, said member having angularly disposed portions provided with gear teeth, and a pinion operating on the teeth of said portions to move said member in the direction of the first mentioned axis and about the second mentioned axis respectively.

2. In a motor vehicle having a frontal surface provided with an opening, a lamp disposed rearwardly of the opening, a closure movable between the lamp and opening to mask and unmask the lamp with respect to the opening, an operating member secured to said closure and movable in the direction of its longitudinal axis and swingable in a path about an axis generally transverse to the first axis to effect movement of the closure as aforesaid, said member having a first rack portion extending in the direction of said longitudinal axis and a second rack portion extending generally transverse to the first portion, and a pinion operable on said first and second portions to respectively move said member in the direction of the first mentioned axis and about the second mentioned axis.

3. In a motor vehicle having a frontal surface provided with an opening, a lamp disposed rearwardly of the opening, a closure movable between the lamp and opening to mask and unmask the lamp with respect to the opening, means supporting said closure for swinging movement and for movement in a direction substantially transversely of the vehicle to mask and unmask said lamp as aforesaid, an actuating rack operatively secured to said closure and arranged for swinging movement and for movement in a direction substantially transversely of the vehicle for moving said closure as aforesaid, and a pinion acting on said rack for moving the latter as aforesaid.

4. In a motor vehicle having a frontal surface provided with an opening, a lamp disposed rearwardly of the opening, a closure movable between the lamp and opening to mask and unmask the lamp with respect to the opening, means supporting said closure for swinging movement and for movement in a direction substantially transversely of the vehicle to mask and unmask said lamp as aforesaid, an actuating rack operatively secured to said closure and arranged for swinging movement and for movement in a direction substantially transversely of the vehicle for moving said closure as aforesaid, and a pinion acting on said rack for moving the latter as aforesaid, said support means being so constructed and arranged as to guide said closure during movement of the latter substantially transversely of the vehicle as aforesaid.

5. In a motor vehicle having a frontal surface provided with an opening, a lamp disposed rearwardly of the opening, a closure movable between the lamp and opening to mask and unmask the lamp with respect to the opening, a movable actuating member for said closure having rack portions, a pinion cooperating with said rack portions for moving said member, and a support for said closure having a portion thereof adapted to guide movement of the closure under the influence of said actuating member, one of said rack portions being so shaped as to shift said closure relative to the opening in response to movement of said actuating member by said pinion prior to movement of the closure to its unmasking position.

6. In a motor vehicle having a frontal surface provided with an opening, a lamp disposed rearwardly of the opening, a closure movable between the lamp and opening to mask and unmask the lamp with respect to the opening, a support member, an actuating member relatively rigidly secured to said closure and attached to said support member for swinging movement relative thereto, said member having relatively angularly disposed rack portions, and a pinion operable when engaged with one of said rack portions to swing said actuating member as aforesaid, said pinion being operable when engaged with the other of said rack portions to move said actuating member in a direction transversely of the axis of said swinging movement.

7. In a motor vehicle having a frontal surface provided with an opening, a lamp disposed rearwardly of the opening, a closure movable between the lamp and opening to mask and unmask the lamp with respect to the opening, a support member, an actuating member relatively rigidly secured to said closure and attached to said support member for swinging movement relative thereto, said member having relatively angularly disposed rack portions, and a pinion operable when engaged with one of said rack portions to swing said actuating member as aforesaid, said pinion being operable when engaged with the other of said rack portions to move said actuating member in a direction transversely of the axis of said swinging movement, said support member guiding said actuating member during movement of the latter in said transverse direction.

8. In a motor vehicle having a frontal surface provided with spaced openings, a lamp disposed rearwardly of each of said openings, a support for said lamps, a closure for each of said openings secured to said support for movement in a path transversely of the vehicle to mask and unmask the lamp with respect to the opening, operating members secured to a respective closure and to said support for movement in a path transversely of the vehicle, the means securing the closures and members to said support accommodating swinging movement thereof relative to said support as an incident to movement of the closures and supports in said path, each of said operating members having angularly disposed rack portions, a pinion acting on each of said rack portions for moving said members, gears respectively driving said pinions and meshing one with the other, and a driving gear meshing with one of said first mentioned gears.

9. In a motor vehicle having a frontal surface provided with an opening, a lamp disposed rearwardly of the opening and registering therewith, a closure for said opening having a face disposed therein masking said lamp, means mounting said closure for movement between the lamp and opening in a substantially linear path extending generally transversely of the vehicle for disposing said face in unmasking position with respect to said lamp, said mounting means accommodating swinging of said closure about a vertical axis to thereby retract at least a portion of said face from said opening and to dispose said closure in said path, a rack operatively secured to said closure adapted for swinging movement and for movement transversely of the vehicle, and a pinion acting on said rack for moving the latter as aforesaid.

10. In a motor vehicle including a frontal surface provided with laterally spaced openings, a lamp disposed rearwardly of and registering with each of said openings, a closure for each of said openings adapted for movement between positions respectively masking and unmasking the lamp, an arm secured to each of said closures for moving the same therewith, each of said arms being mounted for initial swinging movement and subsequent bodily shifting movement one toward the other in a direction of its longitudinal axis to thereby move the associated closure from masking to unmasking position, and means for simultaneously moving said arms as aforesaid including a rack carried by each of said arms for movement therewith and having angularly disposed portions, a pinion acting on each of said racks for moving the same, and means for simultaneously actuating said pinions.

CLIFFORD C. JACKSON.